United States Patent
Yan et al.

(10) Patent No.: US 10,543,775 B2
(45) Date of Patent: Jan. 28, 2020

(54) LIGHTING CONTROL METHOD, LIGHTING CONTROL DEVICE AND VEHICLE

(71) Applicant: BOE TECHNOLOGY GROUP CO., LTD., Beijing (CN)

(72) Inventors: Han Yan, Beijing (CN); Zhiguo Zhang, Beijing (CN); Enhui Guan, Beijing (CN); Xitong Ma, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/039,315

(22) Filed: Jul. 18, 2018

(65) Prior Publication Data
US 2019/0202342 A1 Jul. 4, 2019

(30) Foreign Application Priority Data
Jan. 3, 2018 (CN) .......................... 2018 1 0005984

(51) Int. Cl.
*B60Q 1/14* (2006.01)
*H04B 10/80* (2013.01)

(52) U.S. Cl.
CPC .......... *B60Q 1/143* (2013.01); *B60Q 2300/41* (2013.01); *B60Q 2300/42* (2013.01); *H04B 10/80* (2013.01)

(58) Field of Classification Search
CPC ........................... B60Q 1/143; B60Q 2300/40; B60Q 2300/41; B60Q 2300/42; H04B 10/80; H04B 10/66; H04B 10/116
See application file for complete search history.

(56) References Cited

U.S. PATENT DOCUMENTS

| | | | |
|---|---|---|---|
| 8,031,062 B2* | 10/2011 | Smith | G08G 1/166 340/438 |
| 2015/0202939 A1* | 7/2015 | Stettner | B60R 21/0134 701/37 |
| 2016/0003946 A1* | 1/2016 | Gilliland | G01S 17/10 356/5.01 |
| 2018/0152250 A1* | 5/2018 | Yamasaki | H04B 10/116 |
| 2018/0219634 A1* | 8/2018 | Laski | G01S 17/936 |

FOREIGN PATENT DOCUMENTS

| | | |
|---|---|---|
| CN | 104228678 A | 12/2014 |
| CN | 106059666 A | 10/2016 |
| CN | 206598771 U | 10/2017 |
| EP | 2284040 A1 | 2/2011 |

OTHER PUBLICATIONS

First Chinese Office Action dated May 29, 2019, received for corresponding Chinese Application No. 201810005984.0.

* cited by examiner

*Primary Examiner* — Thai Pham
(74) *Attorney, Agent, or Firm* — Kinney & Lange, P.A.

(57) ABSTRACT

A lighting control method for use in a first vehicle is provided. The method includes receiving an optical signal from a lamp of a second vehicle; identifying a pulse signal included in the optical signal; determining a position of the second vehicle relative to the first vehicle; and controlling a lamp of the first vehicle in accordance with the position of the second vehicle and the pulse signal.

12 Claims, 2 Drawing Sheets

LIGHTING CONTROL METHOD, LIGHTING CONTROL DEVICE AND VEHICLE

CROSS-REFERENCE TO RELATED APPLICATION

The present application claims a priority of the Chinese patent application No. 201810005984.0 filed on Jan. 3, 2018, which is incorporated herein by reference in its entirety.

TECHNICAL FIELD

The present disclosure relates to the field of vehicle security technology, in particular to a lighting control method, a lighting control device and a vehicle.

BACKGROUND

Along with the improvement of living standards, the number of automobiles is increasing all the time. Due to a better illumination effect than a low-beam headlamp, a driver prefers to use a high-beam headlamp at night. However, when two vehicles meet each other or one vehicle follows the other, a line of sight of another driver may be seriously interfered due to the use of the high-beam headlamp, which is one of the principal reasons for frequent traffic accidents at night.

Hence, there is an urgent need to prevent the occurrence of danger for the driver due to the vehicle light interference.

SUMMARY

In one aspect, the present disclosure provides in some embodiments a lighting control method for use in a first vehicle, including: receiving an optical signal from a lamp of a second vehicle; identifying a pulse signal included in the optical signal; determining a position of the second vehicle relative to the first vehicle; and controlling a lamp of the first vehicle in accordance with the position of the second vehicle and the pulse signal.

In a possible embodiment of the present disclosure, an optical demodulator is arranged at each of a head end and a rear end of the first vehicle. The determining the position of the second vehicle relative to the first vehicle includes: when the optical demodulator at the head end of the first vehicle has received a first pulse signal or a third pulse signal, determining that the second vehicle is located in front of the first vehicle and runs in a direction opposite to the first vehicle; when the optical demodulator at the head end of the first vehicle has received a second pulse signal, determining that the second vehicle is located in front of the first vehicle and runs in a same direction as the first vehicle; and when the optical demodulator at the rear end of the first vehicle has received the first pulse signal, determining that the second vehicle is located behind the first vehicle and runs in the same direction as the first vehicle.

In a possible embodiment of the present disclosure, the first pulse signal includes identification information about a headlamp and warning information indicating that a high-beam headlamp of the vehicle is in an on state. The second pulse signal includes identification information about a taillamp and prompt information for prompting a driver to switch the high-beam headlamp into a low-beam headlamp. The third pulse signal includes the identification information about the headlamp and the prompt information for prompting the driver to switch the high-beam headlamp into the low-beam headlamp.

In a possible embodiment of the present disclosure, the controlling the lamp of the first vehicle in accordance with the position of the second vehicle and the pulse signal includes, when the pulse signal is the first pulse signal, and the second vehicle is located in front of the first vehicle and runs in the direction opposite to the first vehicle, controlling the headlamp of the first vehicle to generate and transmit the third pulse signal.

In a possible embodiment of the present disclosure, subsequent to controlling the headlamp of the first vehicle to generate the third pulse signal, the lighting control method further includes: controlling the headlamp of the first vehicle to be switched from the high-beam headlamp into the low-beam headlamp; or upon the receipt of the third pulse signal from the second vehicle, controlling the headlamp of the first vehicle to be switched from the high-beam headlamp into the low-beam headlamp.

In a possible embodiment of the present disclosure, the controlling the lamp of the first vehicle in accordance with the position of the second vehicle and the pulse signal includes, when the pulse signal includes the first pulse signal, and the second vehicle is located behind the first vehicle and runs in the same direction as the first vehicle, controlling the taillamp of the first vehicle to generate the second pulse signal.

In a possible embodiment of the present disclosure, the controlling the lamp of the first vehicle in accordance with the position of the second vehicle and the pulse signal includes, when the pulse signal includes the second pulse signal, and the second vehicle is located in front of the first vehicle and runs in the same direction as the first vehicle, controlling the headlamp of the first vehicle to be switched from the high-beam headlamp into the low-beam headlamp.

In another aspect, the present disclosure provides in some embodiments a lighting control device for use in a first vehicle, including: an optical demodulator configured to receive an optical signal from a lamp of a second vehicle; an identification circuitry configured to identify a pulse signal included in the optical signal; a position determination circuitry configured to determine a position of the second vehicle relative to the first vehicle; and a controller configured to control a lamp of the first vehicle in accordance with the position of the second vehicle and the pulse signal.

In a possible embodiment of the present disclosure, the optical demodulator is arranged at each of a head end and a rear end of the first vehicle. The position determination circuitry includes: a first determination sub-circuitry configured to, when the optical demodulator at the head end of the first vehicle has received a first pulse signal or a third pulse signal, determine that the second vehicle is located in front of the first vehicle and runs in a direction opposite to the first vehicle; a second determination sub-circuitry configured to, when the optical demodulator at the head end of the first vehicle has received a second pulse signal, determine that the second vehicle is located in front of the first vehicle and runs in a same direction as the first vehicle; and a third determination sub-circuitry configured to, when the optical demodulator at the rear end of the first vehicle has received the first pulse signal, determine that the second vehicle is located behind the first vehicle and runs in the same direction as the first vehicle.

In a possible embodiment of the present disclosure, the first pulse signal includes identification information about a headlamp and warning information indicating that a high-beam headlamp of the vehicle is in an on state. The second pulse signal includes identification information about a taillamp and prompt information for prompting a driver to switch the high-beam headlamp into a low-beam headlamp. The third pulse signal includes the identification information about the headlamp and the prompt information for prompting the driver to switch the high-beam headlamp into the low-beam headlamp.

In a possible embodiment of the present disclosure, the controller is further configured to, when the pulse signal is the first pulse signal, and the second vehicle is located in front of the first vehicle and runs in the direction opposite to the first vehicle, control the headlamp of the first vehicle to generate and transmit the third pulse signal.

In yet another aspect, the present disclosure provides in some embodiments a vehicle including the above-mentioned lighting control device.

DETAILED DESCRIPTION OF EMBODIMENTS

In order to make the objects, the technical solutions and the advantages of the present disclosure more apparent, the present disclosure will be described hereinafter in a clear and complete manner in conjunction with the drawings and embodiments.

Figure 1:
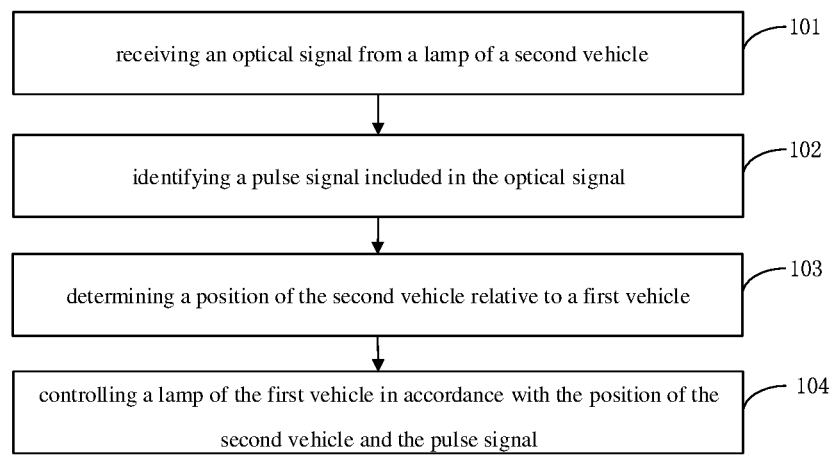
FIG. 1 is a flow chart of a lighting control method according to one embodiment of the present disclosure.

The present disclosure provides in some embodiments a lighting control method for use in a first vehicle which, as shown in FIG. 1, may include the following steps.

Step 101: receiving an optical signal from a lamp of a second vehicle.

Figure 2:
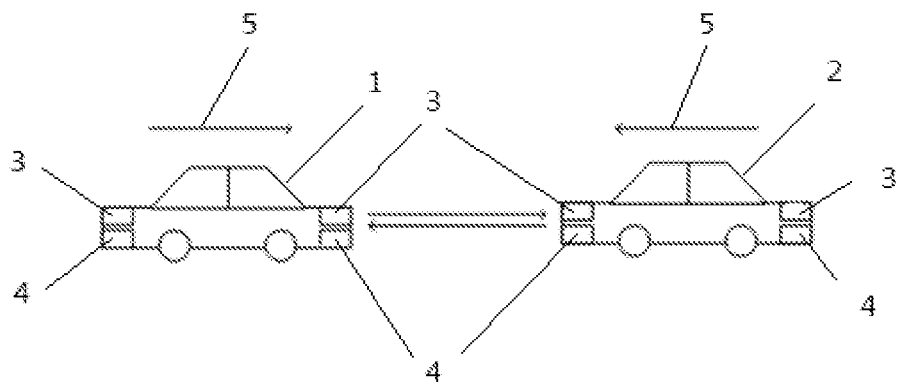
FIG. 2 is a schematic view showing a situation where information exchange occurs between two vehicles according to one embodiment of the present disclosure.
Figure 3:
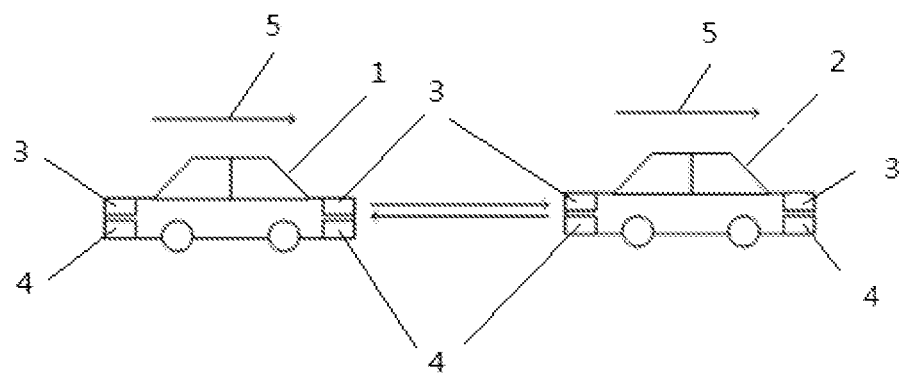
FIG. 3 is another schematic view showing the situation where the information exchange occurs between two vehicles according to one embodiment of the present disclosure.

In the embodiments of the present disclosure, an optical demodulator and an optical modulator are arranged at each of a head end and a rear end of each of the first vehicle and the second vehicle. As shown in FIGS. 2 and 3, 3 represents the optical modulator and 4 represents the optical demodulator.

When each vehicle runs with its high-beam headlamp being turned on, the optical modulator may generate the pulse signal in an encoded mode. The pulse signal is used to indicate that the vehicle is currently in a state where the high-beam headlamp is turned on. The optical modulator may modulate the pulse signal into the optical signal generated by the high-beam headlamp, and the optical demodulator of the other vehicle may receive the pulse signal.

In actual use, the pulse signal may be generated as follows.

For example, when the lamp of the vehicle is turned on, a current lamp state may be recorded as 1, and when the lamp is turned off, the current lamp state may be recorded as 0. When the vehicle runs with the high-beam headlamp being turned on, a sequence consisting of 0 and 1 may be generated continuously by the lamp, so as to form the pulse signal and transmit the pulse signal by modulating it into the optical signal generated by the high-beam headlamp.

Of course, the above example is merely provided for ease of understanding, but shall not be used to uniquely limit the scope of the present disclosure.

Due to the optical demodulators at both the head end and the rear end of each vehicle, a current vehicle may receive the optical signal from a vehicle in front of or behind the current vehicle, so as to determine whether the vehicle in front of or behind the current vehicle is in a state where the high-beam headlamp is turned on.

After the optical demodulator has received the optical signal generated by the lamp of the second vehicle, Step 102 may be performed.

Step 102: identifying the pulse signal in the optical signal.

The optical demodulator of the first vehicle may decode the optical signal from the second vehicle to acquire the optical signal, and demodulate the optical signal to identify the pulse signal in the optical signal.

After the identification of the pulse signal in the optical signal from the second vehicle, Step 103 may be performed.

Step 103: determining a position of the second vehicle relative to the first vehicle.

In a possible embodiment of the present disclosure, the first vehicle may run in a same direction as the second vehicle, or in a direction opposite to the second vehicle. In addition, when the first vehicle runs in the same direction as the second vehicle, the first vehicle may be located behind or in front of the second vehicle.

When the first vehicle is located behind or in front of the second vehicle, it means that the first vehicle runs on a same road as the second vehicle in the driving direction.

After the identification of the pulse signal in the optical signal from the second vehicle, it is necessary to determine the position of the second vehicle relative to the first vehicle, so as to control the lamp.

In a possible embodiment of the present disclosure, Step 103 may include: Step 1031 of, when the optical demodulator at the head end of the first vehicle has received a first pulse signal or a third pulse signal, determining that the second vehicle is located in front of the first vehicle and runs in the direction opposite to the first vehicle; Step 1032 of, when the optical demodulator at the head end of the first vehicle has received a second pulse signal, determining that the second vehicle is located in front of the first vehicle and runs in the same direction as the first vehicle; and Step 1033 of, when the optical demodulator at the rear end of the first vehicle has received the first pulse signal, determining that the second vehicle is located behind the first vehicle and runs in the same direction as the first vehicle.

In a possible embodiment of the present disclosure, the first pulse signal includes identification information about the headlamp and warning information indicating that the high-beam headlamp of the vehicle is in an on state. The second pulse signal includes identification information about a taillamp and prompt information for prompting a driver to switch the high-beam headlamp into a low-beam headlamp. The third pulse signal includes the identification information about the headlamp and the prompt information for prompting the driver to switch the high-beam headlamp into the low-beam headlamp.

To be specific, there may be the following circumstances for the position of the second vehicle relative to the first vehicle.

In a first circumstance, when the optical demodulator at the head end of the first vehicle has received the first pulse signal or the third pulse signal, it may be determined that the second vehicle is currently located in front of the first vehicle and runs in the direction opposite to the first vehicle.

In a second circumstance, when the optical demodulator at the head end of the first vehicle has received the second pulse signal, it may be determined that the second vehicle is currently located in front of the first vehicle and runs in the same direction as the first vehicle.

In a third circumstance, when the optical demodulator at the rear end of the first vehicle has received the first pulse signal, it may be determined that the second vehicle is currently located behind the first vehicle and runs in the same direction as the first vehicle.

After the determination of the position of the second vehicle relative to the first vehicle, Step 104 may be performed.

Step 104: controlling the lamp of the first vehicle in accordance with the position of the second vehicle and the pulse signal.

In the embodiments of the present disclosure, a controller may be arranged on each of the first vehicle and the second vehicle, and configured to turn on or off the lamp of the corresponding vehicle and switch the headlamp of the vehicle between the high-beam headlamp and the low-beam headlamp.

After the identification of the pulse signal in the optical signal from the second vehicle and the determination of the position of the second vehicle relative to the first vehicle, the controller of the first vehicle may control the lamp of the first vehicle in accordance with the position of the second vehicle and the pulse signal.

The control over the lamp of the vehicle in accordance with the position of the second vehicle relative to the first vehicle and the pulse signal will be described hereinafter in more details.

In a possible embodiment of the present disclosure, Step 104 may include Step 1041 of, when the pulse signal is the first pulse signal, and the second vehicle is located in front of the first vehicle and runs in the direction opposite to the first vehicle, controlling the headlamp of the first vehicle to generate the third pulse signal.

In the embodiments of the present disclosure, the description is given in a scenario where the first vehicle and second vehicle meet each other and both the first vehicle and the second vehicle are in the state where the high-beam headlamp is in the on state.

Referring to FIG. 2 which shows a situation where information exchange occurs between two vehicles, 1 represents the first vehicle, 2 represents the second vehicle, 3 represents the optical modulator, 4 represents the optical demodulator and 5 represents a driving direction.

When the second vehicle 2 runs in the state where its high-beam headlamp is turned on, the optical modulator 3 of the second vehicle may transmit the optical signal including the first pulse signal indicating that the second vehicle 2 is in the state where the high-beam headlamp is turned on.

After the optical demodulator 4 of the first vehicle 1 has received the optical signal from the optical modulator 3 of the second vehicle 2, the optical modulator 3 of the first vehicle 1 may generate the corresponding prompt information so as to prompt the driver of the second vehicle 2 to switch the high-beam headlamp into the low-beam headlamp.

The prompt information may be generated by the first vehicle 1 in a known way. For example, the controller of the first vehicle 1 may perform a switching operation, i.e., "low beam→high beam→low beam", for one time or multiple times.

Of course, in actual use, the prompt information may also be generated in any other ways, which will not be particularly defined herein.

After the generation of the prompt information, the optical modulator 3 of the first vehicle 1 may encode the prompt information to acquire the third pulse signal, modulate the third pulse signal into the optical signal generated by the headlamp of the first vehicle 1, and then transmit the resultant optical signal. The optical demodulator 4 of the second vehicle 2 may receive the optical signal, so as to prompt the second vehicle 2 to switch the high-beam headlamp into the low-beam headlamp.

In a possible embodiment of the present disclosure, subsequent to Step 1041, the lighting control method may further include Step 10410 of controlling the headlamp of the first vehicle to be switched from the high-beam headlamp into the low-beam headlamp, or upon the receipt of the third pulse signal from the second vehicle, controlling the headlamp of the first vehicle to be switched from the high-beam headlamp into the low-beam headlamp.

After the headlamp of the first vehicle has transmitted the prompt information, the controller of the first vehicle may control the high-beam headlamp of the first vehicle to be switched into the low-beam headlamp.

Upon the receipt of the third pulse signal from the headlamp of the second vehicle, the optical demodulator of the first vehicle may parse the third pulse signal to acquire the prompt information indicating that the first vehicle is to be switched from the high-beam headlamp into the low-beam headlamp. Then, the controller of the first vehicle may control the high-beam headlamp of the first vehicle to be switched into the low-beam headlamp.

In a possible embodiment of the present disclosure, Step 104 may further include Step 1042 of, when the pulse signal includes the first pulse signal, and the second vehicle is located behind the first vehicle and runs in the same direction as the first vehicle, controlling the taillamp of the first vehicle to generate the second pulse signal.

In the embodiments of the present disclosure, the description is given in a scenario where the first vehicle and the second vehicle run in the same direction and the second vehicle is in the state where the high-beam headlamp is turned on.

The first pulse signal includes the identification information about the headlamp and the warning information indicating that the vehicle is in the state where the high-beam headlamp is turned on, i.e., the second vehicle is located behind the first vehicle.

Referring to FIG. 3, which shows the situation where the information exchange occurs between two vehicle, 1 represents the first vehicle, 2 represents the second vehicle, 3 represents the optical modulator, 4 represents the optical demodulator, and 5 represents the driving direction.

When the second vehicle 1 is located behind the first vehicle 2 and runs in the state where the high-beam headlamp is turned on, the optical modulator 3 of the second vehicle 1 may transmit the optical signal including the first pulse signal. The first pulse signal is generated by the headlamp of the second vehicle 1 and includes the warning information indicating that the second vehicle 1 is in the state where the high-beam headlamp is turned on.

Upon the receipt of the first pulse signal from the optical modulator 3 of the second vehicle 1, the optical demodulator 4 of the first vehicle 2 may parse the first pulse signal to acquire the warning information, and then the optical modulator 3 of the first vehicle 2 may generate the corresponding prompt information indicating that the headlamp of the second vehicle 1 is to be switched from the high-beam headlamp into the low-beam headlamp.

The prompt information may be generated by the first vehicle 2 in a known way. For example, the controller of the first vehicle 2 may control the taillamp to be twinkled or perform a switching operation between the taillamp and a fog lamp.

Of course, in actual use, the prompt information may also be generated in any other ways, which will not be particularly defined herein.

After the generation of the prompt information, the optical modulator 3 of the first vehicle 2 may encode the prompt information to acquire the second pulse signal, modulate the second pulse signal into the optical signal generated by the taillamp of the first vehicle 2, and then transmit the resultant optical signal. The optical demodulator 4 of the second vehicle 1 may receive and parse the optical signal to acquire the prompt information, and then the controller of the second vehicle 1 may control the high-beam headlamp to be switched into the low-beam headlamp automatically.

In a possible embodiment of the present disclosure, Step 104 may further include Step 1043 of, when the pulse signal includes the second pulse signal, and the second vehicle is located in front of the first vehicle and runs in the same direction as the first vehicle, controlling the headlamp of the first vehicle to be switched from the high-beam headlamp into the low-beam headlamp.

In the embodiments of the present disclosure, the description is given in the scenario where the first vehicle and the second vehicle run in the same direction and the first vehicle is in the state where the high-beam headlamp is turned on.

The second pulse signal includes the identification information about the taillamp and the prompt information for prompting the vehicle to be switched from the high-beam headlamp into the low-beam headlamp.

Referring to FIG. 3, which shows the situation where the information exchange occurs between two vehicles, 1 represents the first vehicle, 2 represents the second vehicle, 3 represents the optical modulator, 4 represents the optical demodulator, and 5 represents the driving direction.

When the second vehicle 2 is located in front of the first vehicle 1 and the first vehicle 1 runs in the state where the high-beam headlamp is turned on, the optical modulator 3 of the first vehicle 1 may transmit the optical signal including the second pulse signal. The second pulse signal includes the prompt information for prompting the first vehicle 1 to be switched from the high-beam headlamp into the low-beam headlamp.

After the optical demodulator 4 of the second vehicle 2 has received the optical signal from the first vehicle 1 and identified the first pulse signal including the warning information indicating that the high-beam headlamp of the first vehicle 1 is turned on, the optical modulator 3 of the second vehicle 2 may generate the corresponding prompt information for prompting the first vehicle 1 to switch the high-beam headlamp into the low-beam headlamp. The optical modulator 3 of the second vehicle 2 may encode the prompt information to generate the second pulse signal, and then modulate the second pulse signal into the optical signal generated by the taillamp.

Upon the receipt of the optical signal from the taillamp of the second vehicle 2, the optical demodulator of the first vehicle 1 may identify the second pulse signal in the optical signal, and parse the second pulse signal to acquire the prompt information. Then, the controller of the first vehicle 1 may switch the high-beam headlamp into the low-beam headlamp automatically.

According to the lighting control method in the embodiments of the present disclosure, through receiving the optical signal from the lamp of the second vehicle, identifying the pulse signal in the optical signal, determining the position of the second vehicle relative to the first vehicle and controlling the lamp of the first vehicle in accordance with the position of the second vehicle and the pulse signal, it is able to achieve the information exchange between the two vehicles using an optical pulse and automatically change a state of the lamp, thereby to prevent the occurrence of any danger for the driver due to the vehicle light interference.

Figure 4:
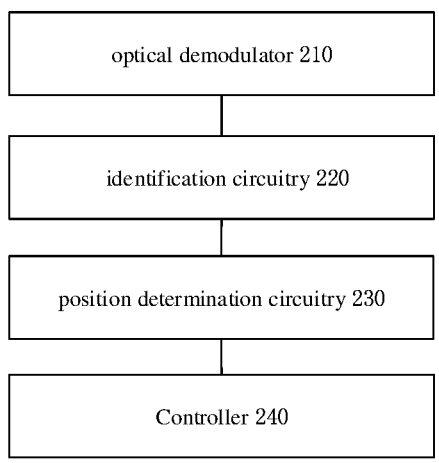
FIG. 4 is a schematic view showing a lighting control device according to one embodiment of the present disclosure.

The present disclosure further provides in some embodiments a lighting control device for use in a first vehicle which, as shown in FIG. 4, may include: an optical demodulator 210 configured to receive an optical signal from a lamp of a second vehicle; an identification circuitry 220 configured to identify a pulse signal included in the optical signal; a position determination circuitry 230 configured to determine a position of the second vehicle relative to the first vehicle; and a controller 240 configured to a lamp of the first vehicle in accordance with the position of the second vehicle and the pulse signal.

In a possible embodiment of the present disclosure, the optical demodulator is arranged at each of a head end and a rear end of the first vehicle. The position determination circuitry includes: a first determination sub-circuitry configured to, when the optical demodulator at the head end of the first vehicle has received a first pulse signal or a third pulse signal, determine that the second vehicle is located in front of the first vehicle and runs in a direction opposite to the first vehicle; a second determination sub-circuitry configured to, when the optical demodulator at the head end of the first vehicle has received a second pulse signal, determine that the second vehicle is located in front of the first vehicle and runs in a same direction as the first vehicle; and a third determination sub-circuitry configured to, when the optical demodulator at the rear end of the first vehicle has received the first pulse signal, determine that the second vehicle is located behind the first vehicle and runs in the same direction as the first vehicle.

In a possible embodiment of the present disclosure, the first pulse signal includes identification information about a headlamp and warning information indicating that a high-beam headlamp of the vehicle is in an on state. The second pulse signal includes identification information about a taillamp and prompt information for prompting a driver to switch the high-beam headlamp into a low-beam headlamp. The third pulse signal includes the identification information about the headlamp and the prompt information for prompting the driver to switch the high-beam headlamp into the low-beam headlamp.

In a possible embodiment of the present disclosure, the controller is further configured to, when the pulse signal is the first pulse signal, and the second vehicle is located in front of the first vehicle and runs in the direction opposite to the first vehicle, control the headlamp of the first vehicle to generate the third pulse signal.

The implementation of the lighting control device is substantially similar to that of the lighting control method in FIG. 1, and thus may refer to that mentioned above.

According to the lighting control device in the embodiments of the present disclosure, through receiving the optical signal from the lamp of the second vehicle, identifying the pulse signal in the optical signal, determining the position of the second vehicle relative to the first vehicle and controlling the lamp of the first vehicle in accordance with the position of the second vehicle and the pulse signal, it is able to achieve the information exchange between the two vehicles using an optical pulse and automatically change a state of the lamp, thereby to prevent the occurrence of any danger for the driver due to the vehicle light interference.

The present disclosure further provides in some embodiments a vehicle including the above-mentioned lighting control device.

For ease of description, the above-mentioned method has been described on the basis of a series of steps, and it should be appreciated that, these steps may also be performed in any other order or simultaneously. In addition, the above embodiments are for illustrative purposes only, and the steps and modules involved therein are not always necessary.

The above embodiments are described in a progressive manner, and the same or similar contents in the embodiments are not repeated, i.e., each embodiment merely focuses on the difference from the others.

It should be further appreciated that, such words as "first" and "second" are merely used to separate one entity or operation from another entity or operation, but are not necessarily used to represent or imply any relation or order between the entities or operations. In addition, such terms as "include" or "including" or any other variations involved in the present disclosure intend to provide non-exclusive coverage, so that a procedure, method, article or device including a series of elements may also include any other elements not listed herein, or may include any inherent elements of the procedure, method, article or device. If without any further limitations, for the elements defined by such sentence as "including one . . . ", it is not excluded that the procedure, method, article or device including the elements may also include any other identical elements.

The lighting control method, the lighting control device and the vehicle have been described hereinabove in details. The principle and the implementation of the present disclosure has been set forth with reference to the embodiments, and these embodiments are merely used to facilitate the understanding of the method and the core concept of the present disclosure. Based on the concept of the present disclosure, a person skilled in the art may make further modifications without departing from the spirit of the present disclosure. In a word, the contents in the specification shall not be construed as limiting the scope of the present disclosure.

What is claimed is:

1. A lighting control method for use in a first vehicle, comprising:
   receiving an optical signal, via an optical demodulator, from a lamp of a second vehicle;
   identifying a pulse signal, via identification circuitry, included in the optical signal;
   determining a position of the second vehicle, via position determination circuitry, relative to the first vehicle; and
   controlling a lamp of the first vehicle, via a controller, in accordance with the position of the second vehicle and the pulse signal,
   wherein the optical demodulator is arranged at each of a head end and a rear end of the first vehicle, and wherein determining the position of the second vehicle relative to the first vehicle comprises:
      when the optical demodulator at the head end of the first vehicle has received a first pulse signal or a third pulse signal as the pulse signal, determining that the second vehicle is located in front of the first vehicle and runs in a direction opposite to the first vehicle;
      when the optical demodulator at the head end of the first vehicle has received a second pulse signal as the pulse signal, determining that the second vehicle is located in front of the first vehicle and runs in a same direction as the first vehicle; and
      when the optical demodulator at the rear end of the first vehicle has received the first pulse signal as the pulse signal, determining that the second vehicle is located behind the first vehicle and runs in the same direction as the first vehicle.

2. The lighting control method according to claim 1, wherein the first pulse signal comprises identification information about a headlamp and warning information indicating that a high-beam headlamp of the vehicle is in an on state, the second pulse signal comprises identification information about a taillamp and prompt information for prompting a driver to switch the high-beam headlamp to a low-beam headlamp, and the third pulse signal comprises the identification information about the headlamp and the prompt information for prompting the driver to switch the high-beam headlamp to the low-beam headlamp.

3. The lighting control method according to claim 2, wherein controlling the lamp of the first vehicle in accordance with the position of the second vehicle and the pulse signal comprises:
   when the pulse signal is the first pulse signal, and the second vehicle is located in front of the first vehicle and runs in the direction opposite to the first vehicle, controlling the headlamp of the first vehicle to generate and transmit the third pulse signal.

4. The lighting control method according to claim 3, wherein subsequent to controlling the headlamp of the first vehicle to generate the third pulse signal, the lighting control method further comprises:
   controlling the headlamp of the first vehicle, via the controller, to switch from the high-beam headlamp to the low-beam headlamp; or
   upon receipt of the third pulse signal from the second vehicle, controlling the headlamp of the first vehicle, via the controller, to switch from the high-beam headlamp to the low-beam headlamp.

5. The lighting control method according to claim 2, wherein controlling the lamp of the first vehicle in accordance with the position of the second vehicle and the pulse signal comprises:
   when the pulse signal comprises the first pulse signal, and the second vehicle is located behind the first vehicle and runs in the same direction as the first vehicle, controlling the taillamp of the first vehicle to generate the second pulse signal.

6. The lighting control method according to claim 1, wherein controlling the lamp of the first vehicle in accordance with the position of the second vehicle and the pulse signal comprises:
   when the pulse signal comprises the second pulse signal, and the second vehicle is located in front of the first vehicle and runs in the same direction as the first vehicle, controlling the headlamp of the first vehicle to be switched from the high-beam headlamp into the low-beam headlamp.

7. A lighting control device for use in a first vehicle, comprising:
   an optical demodulator configured to receive an optical signal from a lamp of a second vehicle; and
   identification circuitry configured to identify a pulse signal included in the optical signal;
   position determination circuitry configured to determine a position of the second vehicle relative to the first vehicle; and a controller configured to control a lamp of the first vehicle in accordance with the position of the second vehicle and the pulse signal, wherein the optical demodulator is arranged at each of a head end and a rear end of the first vehicle, and wherein the position determination circuitry is further configured to:

when the optical demodulator at the head end of the first vehicle has received a first pulse signal or a third pulse signal as the pulse signal, determine that the second vehicle is located in front of the first vehicle and runs in a direction opposite to the first vehicle;

when the optical demodulator at the head end of the first vehicle has received a second pulse signal as the pulse signal, determine that the second vehicle is located in front of the first vehicle and runs in a same direction as the first vehicle; and when the optical demodulator at the rear end of the first vehicle has received the first pulse signal as the pulse signal, determine that the second vehicle is located behind the first vehicle and runs in the same direction as the first vehicle.

8. The lighting control device according to claim 7, wherein the first pulse signal comprises identification information about a headlamp and warning information indicating that a high-beam headlamp of the vehicle is in an on state, the second pulse signal comprises identification information about a taillamp and prompt information for prompting a driver to switch the high-beam headlamp into a low-beam headlamp, and the third pulse signal comprises the identification information about the headlamp and the prompt information for prompting the driver to switch the high-beam headlamp into the low-beam headlamp.

9. The lighting control device according to claim 8, wherein the controller is further configured to, when the pulse signal is the first pulse signal, and the second vehicle is located in front of the first vehicle and runs in the direction opposite to the first vehicle, control the headlamp of the first vehicle to generate and transmit the third pulse signal.

10. A vehicle, comprising the lighting control device according to claim 7.

11. The vehicle according to claim 10, wherein the first pulse signal comprises identification information about a headlamp and warning information indicating that a high-beam headlamp of the vehicle is in an on state, the second pulse signal comprises identification information about a taillamp and prompt information for prompting a driver to switch the high-beam headlamp into a low-beam headlamp, and the third pulse signal comprises the identification information about the headlamp and the prompt information for prompting the driver to switch the high-beam headlamp into the low-beam headlamp.

12. The vehicle according to claim 11, wherein the controller is further configured to, when the pulse signal is the first pulse signal, and the second vehicle is located in front of the first vehicle and runs in the direction opposite to the first vehicle, control the headlamp of the first vehicle to generate and transmit the third pulse signal.

* * * * *